United States Patent [19]

Ball

[11] Patent Number: 4,937,744

[45] Date of Patent: Jun. 26, 1990

[54] CASH REGISTER METHOD AND APPARATUS

[76] Inventor: Joseph F. Ball, P.O. Box 1476, Stow, Ohio 44224

[21] Appl. No.: 219,598

[22] Filed: Jul. 15, 1988

[51] Int. Cl.$^5$ .............................................. G07G 1/00
[52] U.S. Cl. ...................................... 364/405; 235/22
[58] Field of Search ........................ 364/405; 235/22; 200/61.61

[56] References Cited

U.S. PATENT DOCUMENTS

| | | | |
|---|---|---|---|
| 1,192,095 | 7/1916 | Müller . | |
| 2,143,292 | 8/1935 | Wheelbarger . | |
| 2,267,655 | 12/1941 | Hogfers | 235/22 |
| 2,628,775 | 2/1953 | London | 235/22 |
| 2,649,246 | 8/1953 | Werner | 235/22 |
| 2,650,023 | 8/1953 | Aurbach et al. | 235/22 |
| 2,883,104 | 4/1959 | Kintner | 235/22 |
| 3,017,078 | 1/1962 | Weiner et al. | 235/22 |
| 4,035,792 | 7/1977 | Price et al. | 235/22 X |
| 4,070,564 | 1/1978 | Tucker . | |
| 4,159,533 | 6/1979 | Sakurai | 364/405 |
| 4,720,611 | 1/1988 | Ishii | 235/22 X |
| 4,752,874 | 6/1988 | Meyers | 235/379 X |
| 4,821,309 | 4/1989 | NaMekawa | 379/58 |

*Primary Examiner*—Jerry Smith
*Assistant Examiner*—Steven G. Kirby
*Attorney, Agent, or Firm*—Watts, Hoffmann, Fisher & Heinke Co.

[57] ABSTRACT

A point of sale cash register having multiple drawers. The drawers are opened on a selected basis to prevent employee theft. One procedure would be for the drawers to open randomly so that the employee could not in advance know which drawer was opening. A second procedure would be a random lockout wherein any or all drawers of the cash register are locked until a management employee comes to conduct an audit of cash register receipts. The management employee obtains access to the cash register drawers by means of a key or code word known only to the management employee.

13 Claims, 2 Drawing Sheets

CASH REGISTER METHOD AND APPARATUS

FIELD OF THE INVENTION

The present invention relates to a point of sale cash register utilizing a mechanism for inhibiting employee theft.

BACKGROUND ART

Point of sale cash registers have traditionally provided a mechanism for storing small to medium amounts of cash in retail as well as wholesale establishments. In addition, most cash registers in use today provide a record of sales indicating the amount of money received during a particular time period.

The frequent exchange of cash in a retail establishment has often resulted in a temptation to employees to siphon away monies received during the retail transaction. One mechanism for the owner of the establishment to check the employee is to compare the cash register receipts generating during a given period with the money contained in the cash register. Occasional shortages are typically absorbed as a cost of doing business, but significant shortages on a continuing basis are naturally a cause for concern to the retail establishment owner.

Comparison of the cash register receipts with the money in the cash register does not detect a common mechanism of employee theft which the present invention addresses. This mechanism is for the employee to charge the customer the marked or standard price for an item and ring up a substantially smaller price on the cash register. This practice is particularly common in less sophisticated retail establishments such as restaurants, bars, and the like. If a bartender enters into the cash register a value less than the drink purchased and keeps track of how many times this procedure is followed, at some convenient time when detection is least likely he or she knows exactly how much money to take from the cash register without a discrepancy between cash register receipts and money in the cash register.

One method known to impede, if not stop, this process is for the cash register drawers to be reconciled at unpredictable intervals during the day by management. The cash must be withdrawn from the drawer and compared with the cash register receipt at odd intervals so that the employee will never know how long to keep the extra money in the register. If, for example, the management discovers a significant overage between cash register receipt and money in the register, practice of this common mechanism of employee theft will be the first thing that comes to mind.

The time-consuming process of random, periodic checking between the cash register receipts and its contents is not only inefficient, it intimidates the employee and brings his honesty into question, often unnecessarily. The present invention relates to an automated mechanism for addressing this problem.

DISCLOSURE OF THE INVENTION

The present invention relates to a control method and apparatus for operating a cash register. The main emphasis of this invention is preventing employee theft in an efficient manner without embarrassment to either the employee or the retail management.

In accordance with the invention a point of sale cash register has at least two duplicate drawers for holding money received during point of sale transactions. A user interactive input, typically a keyboard, is used for entering an amount of money received during the transaction. In addition, the keyboard accepts a command for opening the cash drawer for depositing the amount of money received into the drawer. Upon receipt of this command, a control means, typically a computer, determines which of the two duplicate drawers opens in response to the user command.

If, for example, the cash register drawers are designated A and B during operation, A and B might alternate in their opening, open on a random basis, or be programed on some other basis using a combination of random and alternating opening of drawers A and B. This procedure would make it very difficult for the point of sale operator such as the bartender to keep track of the amount of monies to withdraw since he or she would have to keep a running tally of both drawers.

A significant additional feature of the invention is a lockout mechanism implemented on random or predetermined intervals preventing the opening of one or all cash drawers, thus securing the monies for audit until a management employee arrives. The employee's integrity is not directly questioned since management need only explain "This is how the cash register works." Practice of the invention can be accomplished both mechanically and electronically through use of a programed computer. It is envisioned that a mechanical implementation of the invention, although not preferred, could be accomplished with the use of timers which would impose lockouts at predetermined intervals. A preferred embodiment utilizes a computer program interfacing with existing computer programs for operating point of sale cash registers to implement both the random opening of the multiple cash drawers and selected lockout function. In alternate embodiments, the system of the invention could be accomplished with a single computer controlling multiple cash drawers in a kind of networking implementation.

With reference to the lockout feature implementation, it is the intent that the invention include single and multiple drawer cash register systems having this feature.

From the above it is appreciated that one object of the invention is a cash register having multiple drawers which open in a programed sequence to inhibit employee theft. This and other objects, advantages, and features of the invention will become better understood from a detailed description of the invention which is described in conjunction with the accompanying drawings.

BEST MODE FOR PRACTICING THE INVENTION

Figure 1:
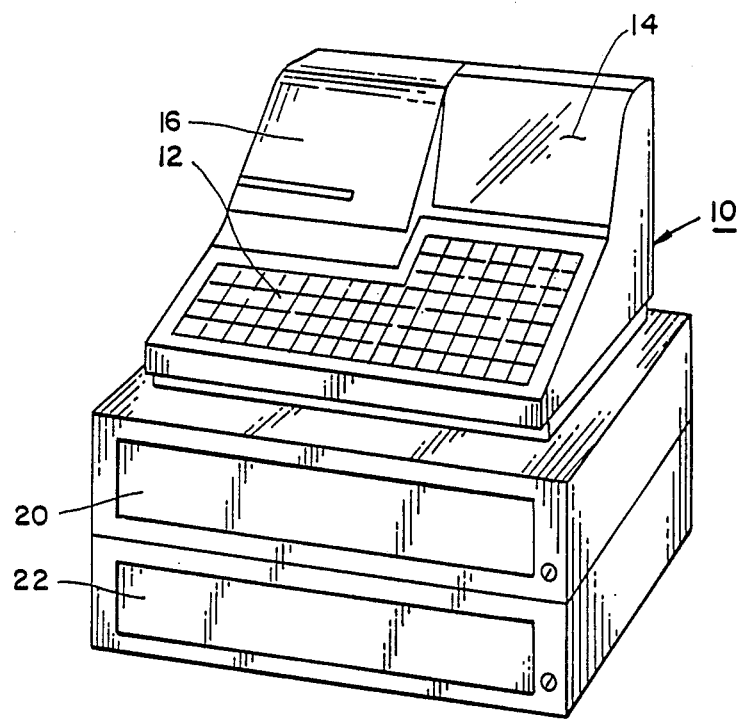
FIG. 1 is a schematic perspective view of a cash register having multiple drawers for storing monies received.

FIG. 1 depicts a cash register 10 having a user input such as a keyboard 12, a visual display or monitor 14, a recording device 16 such as a printer or the like, and two cash drawers 20, 22.

Figure 2:
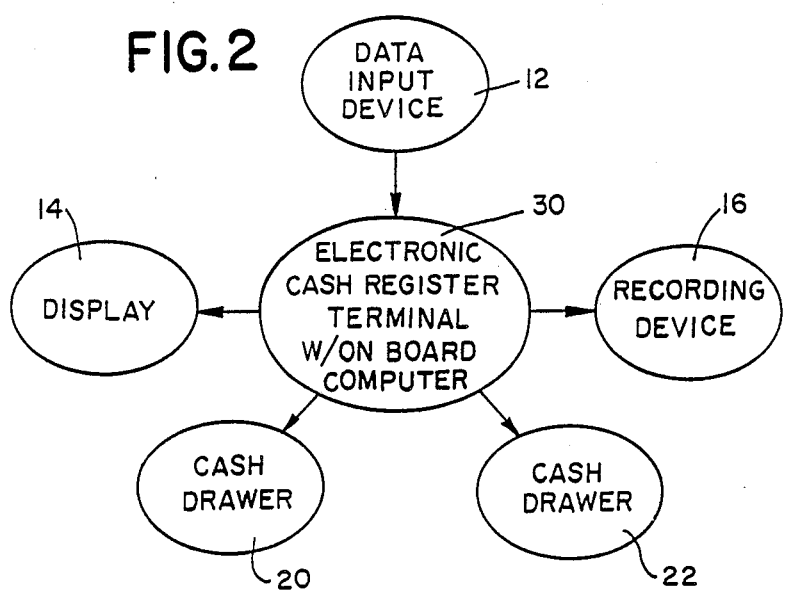
FIGS. 2 and 3 depict alternate embodiments of the cash register control system used in conjunction with the present invention.
Figure 3:
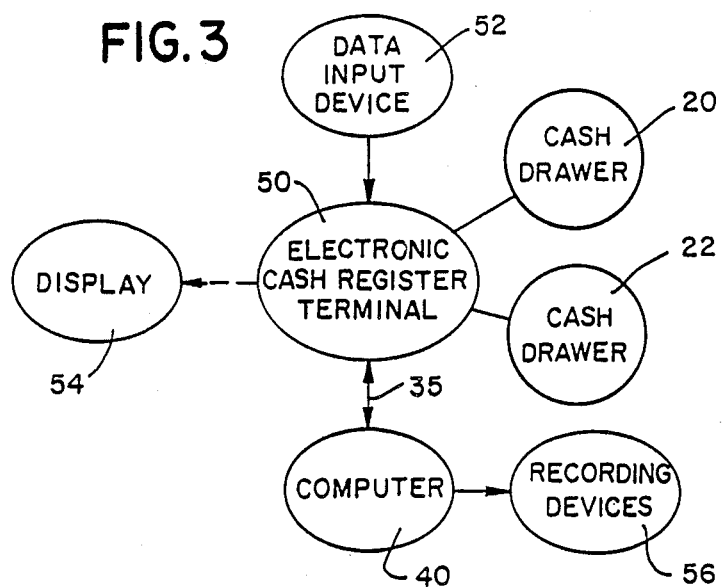

The opening of the drawers 20, 22 is controlled by an onboard computer 30 (FIG. 2) which controls the opening of the two cash drawers 20, 22. Although two drawers are depicted in FIG. 1, it is appreciated that the concepts of the invention can readily be extended to multiple drawers greater than two. The controller 30 preferably comprises a microcomputer that responds to user inputs via the keyboard 12 to open one or the other of the drawers on preferably a random basis. An alternate technique would be for the drawers to alternate in their opening or to open on a semi-random basis wherein the random opening would occur only during predetermined, preprogrammed intervals. Many ways of programming the controller 30 to accomplish this result are known in the art.

Regardless of the program sequence, the opening sequence would be out of the control of the operator at the point of sale cash register. Nor would the sequence of operation be predictable. The electronic controller 30 most typically would be an existing controller utilized in a point of sale cash register and would require the addition of a software "patch" to accomplish the disclosed random opening of cash drawers.

An additional feature of the invention is periodic lockout wherein one or both cash drawers 20, 22 are prevented from opening until a management employee arrives to reopen the cash drawers and to conduct an audit of monies received versus cash register receipts. The mechanism for allowing only the management employee to open the cash drawers could be either through a key, or code-word recognized by the controller 30.

It is envisioned that the invention also be practiced with so-called "dumb" terminals not including their own computer. These terminals would be coupled by a communications link 35 between a separate computer 40 and multiple cash register terminals 50. Each cash register 50 would include a data input device 52 and display 54 but would be controlled as to lockout function and random drawer opening by the separate computer 40 which would have its own recording devices 56 such as printers and the like. This "network" embodiment includes the capability of controlling all cash registers in a retail establishment from a single computer.

The new and improved cash register method and apparatus has been described with a degree of particularity. Although a preferred embodiment utilizes software control for opening or locking out the cash register drawers, it is envisioned that a mechanical design could also be implemented. It is the intent therefore that the invention include all modifications and/or alterations from the disclosed design falling within the spirit or scope of the appended claims.

I claim:
1. A point of sale cash register comprising:
  (a) at least two duplicate drawers for holding money;
  (b) a user interactive input means for entering an amount of money received in a transaction and accepting a command for opening a cash drawer for depositing said amount of money in a drawer; and
  (c) a control means for randomly determining which of said at least two duplicate drawers open in response to the command entered via the user interactive input means.
2. The point of sale cash register of claim 1 where the control means comprises means to prevent access to one or more of the at least two duplicate drawers until a supervisory command is entered via the input.
3. The point of sale cash register of claim 1 where the user interactive input means comprises a keyboard.
4. A method of operating a cash register comprising:
  (a) providing a cash register with at least two duplicate drawers for storing money; and
  (b) randomly opening one of said at least two duplicate drawers in response to an operator input indicating money is to be stored in the cash register.
5. The method of claim 4 additionally comprising the step of imposing a lockout state so that no drawer of said at least two duplicate drawers will open until a supervisory input is entered.
6. A point of sale cash register comprising:
  (a) two or more drawers for holding money;
  (b) a user interactive input means for entering an amount of money received in a transaction and accepting a command for opening one of said two or more cash drawers for depositing said amount of money in a drawer;
  (c) lockout means for automatically preventing access to said two or more cash drawers at difficult to predict times; and
  (d) means for overriding the lockout means to allow at least one of said two or more cash drawers to be opened by a supervisor.
7. The cash register of claim 6 wherein said control means comprises a microcomputer which recognizes an unlock code word entered through the user interactive input to unlock said one or more cash drawers.
8. A point of sale cash register comprising:
  (a) two or more cash drawers for holding money;
  (b) a user interactive input means for entering an amount of money received in a transaction and accepting a command for opening a cash drawer for depositing an amount of money in a cash drawer; and
  (c) control means for opening one of the two or more cash drawers in response to entry of the command via the user interactive input; said control means including automated lockout means to inhibit opening of at least one of said two or more cash drawers at unpredictable times in response to entry of said command via the user interactive input means.
9. The point of sale cash register of claim 8 where the control means includes means for randomly opening a cash drawer.
10. The point of sale cash register of claim 8 where the control means comprises a programmable controller for randomly inhibiting the opening of one of said two or more cash drawers.
11. The point of sale cash register of claim 8 where the control means comprises a programmable controller for randomly opening one of said two or more cash drawers.
12. A method of operating a cash register comprising:
  (a) providing a cash register with at least two duplicate drawers for storing money; and
  (b) randomly preventing the opening one of said at least two duplicate drawers in response to an operator input indicating money is to be stored in the cash register.
13. The method of claim 12 additionally comprising the step of imposing a lockout state so that no drawer of said at least two duplicate drawers will open until a supervisory input is entered.

* * * * *